Oct. 8, 1957 W. S. SWANSON ET AL 2,808,745
CHAMFERING MACHINE
Filed July 1, 1954 2 Sheets-Sheet 1
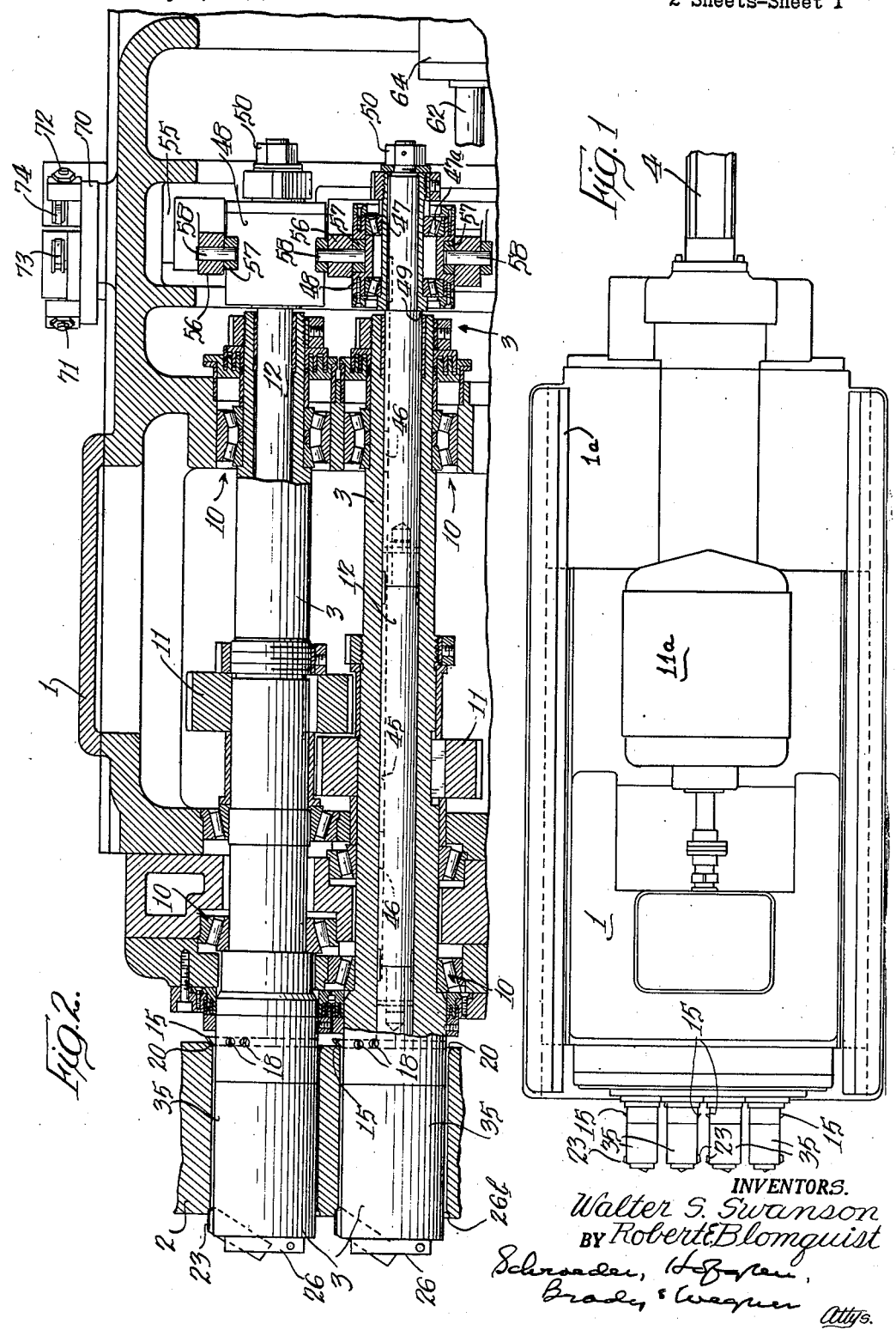
INVENTORS.
Walter S. Swanson
BY Robert E. Blomquist
Schroeder, ...
Brady & ...
Attys.

Oct. 8, 1957   W. S. SWANSON ET AL   2,808,745
CHAMFERING MACHINE
Filed July 1, 1954   2 Sheets-Sheet 2
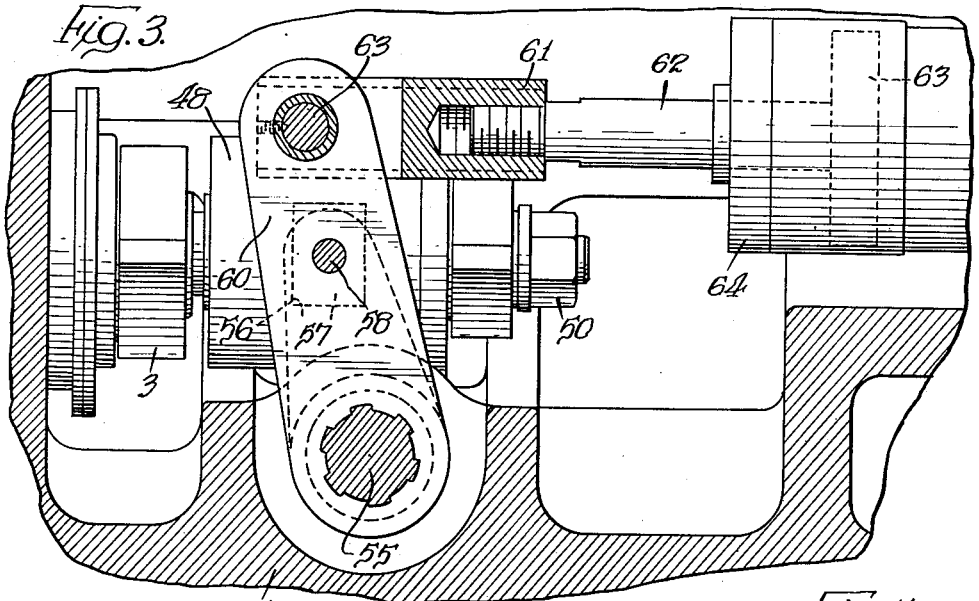
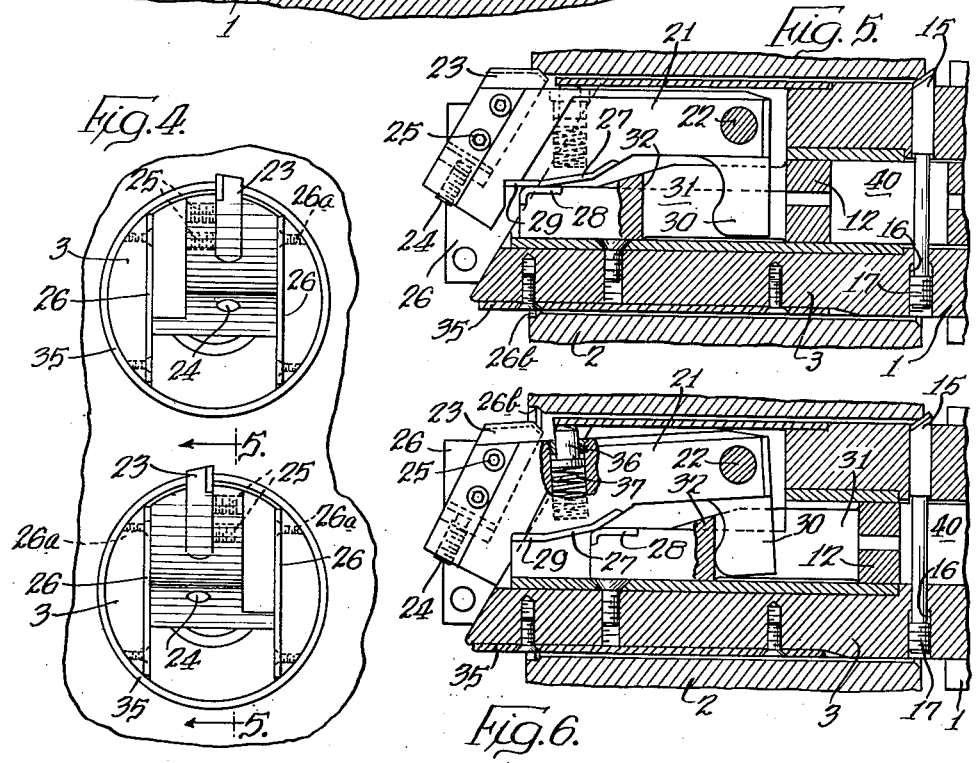
INVENTORS.
Walter S. Swanson
BY Robert E. Blomquist

United States Patent Office 2,808,745
Patented Oct. 8, 1957

2,808,745

CHAMFERING MACHINE

Walter S. Swanson and Robert E. Blomquist, Rockford, Ill., assignors to Sundstrand Machine Tool Co.

Application July 1, 1954, Serial No. 440,694

3 Claims. (Cl. 77—3)

This invention relates to a machine tool for performing operations on a bore in a workpiece and, more particularly, to a machine for chamfering the ends of a bore such as the bores in an engine cylinder block.

An object of this invention is to provide a new and improved machine for chamfering or grooving a bore.

Another object of this invention is to provide a new and improved machine for chamfering the ends of cylinder bores wherein a tool head slidable toward and away from the workpiece carries a plurality of spindles each of which has associated therewith a fixed tool for chamfering one end of the bore as the tool head approaches the workpiece and a movable tool holder carried at the end of each spindle for chamfering the remote end of the bore upon positioning of the tool head adjacent the workpiece and after completion of the chamfering operation by the fixed tools.

Another object of the invention is to provide a chamfering machine as set forth in the preceding paragraph wherein each of the movable tool holders is positively shifted through a feeding movement and a return movement by means independent of the movement of the tool head and operatively connected to said tool holders.

Another object of the invention is to provide a chamfering machine having a tool head slidable toward and away from a workpiece having one or more hollow spindles rotatably mounted therein, each of said spindles having a pivotally mounted tool holder at its end mounted for feed movement between a return position wherein a tool carried thereby is clear of a bore in a workpiece and an extended position, means for moving each of said tool holders including a member slidably mounted in each of said spindles and having an actuating face engageable with means on the tool holder, said means on the tool holder engageable with said actuating face having a first surface inclined with respect to said actuating face for imparting a feed movement to the holder as the member is shifted in one direction and a second surface providing a dwell wherein the holder remains stationary relative to the spindle while the member continues its movement, and means on the member and holder coacting to retract the holder upon movement of the rod in the other direction.

Another object of the invention is to provide a chamfering machine as set forth in the preceding paragraph wherein the members slidable in said one or more spindles have their ends remote from the tool holders extended beyond the spindles, a spool rotatably mounted on the remote end of each of the members, spool shifting means including a spool yoke shaft in the tool head extending transversely to said members, yokes on said shaft associated with said spools, and fluid-operated means for positively rotating said spool yoke shaft in alternate directions for causing movement of the member or members in one direction to move the one or more tool holders through their feeding stroke and, by movement in the other direction, causing shifting of the member or members in an opposite direction to retract the one or more tool holders.

The objects of the invention generally set forth, together with other ancillary advantages, are attained by the construction and arrangement shown by way of illustration in the accompanying drawing, in which:

Fig. 1 is a diagrammatic plan view of the chamfering machine;

Fig. 2 is a horizontal section through the tool head of the chamfering machine showing two of the tool carrying spindles and their associated parts with parts broken away;

Fig. 3 is a vertical section taken along the line 3—3 of Fig. 2;

Fig. 4 is a fragmentary end view looking at the left hand end of Fig. 2;

Fig. 5 is a vertical section taken along the line 5—5 in Fig. 4 showing the pivotally mounted tool holder at the ends of its feed movement position, and;

Fig. 6 is a view similar to Fig. 5 showing the tool holder in its return position.

While this invention is susceptible of embodiment in many different forms, there is shown in the drawings and will herein be described in detail an illustrative embodiment of the invention with the understanding that the present disclosure is to be considered as an exemplification of the principles of the invention and is not intended to limit the invention to the embodiment illustrated. The scope of the invention will be pointed out in the appended claims.

The chamfering machine comprises, as shown in Figs. 1 and 2, a tool head 1 which is slidable on ways 1a toward and away from a workpiece 2 and carries a plurality of spaced parallel hollow spindles 3. The tool head 1 is actuated by a hydraulic cylinder 4 which is secured to the base of the machine and which has its piston (not shown) connected to the head 1.

As the spindles and their associated parts are of the same construction, it will suffice to describe only one in detail. As shown in Fig. 2, each of the spindles 3 is rotatably mounted in the tool head 1 by thrust bearings indicated generally at 10 and is driven by gear means 11 which are driven from a power source such as motor 11a by a drive train (not shown). In order to balance the forces, it is desirable to have the pair of spindles on one side of the tool head centerline rotate counter to each other. A tool-expanding rod 12 is rotatable with and slidably mounted within each of the hollow spindles.

The spindle 3 has one of its ends extending beyond the tool head for a distance slightly greater than the depth of a bore in the workpiece. Means are provided in this end of the spindle for holding a fixed tool 15 extending generally normal to the spindle axis comprising an opening 16 in the spindle 3 and threaded members 17 and 18 which securely hold the fixed tool in the slot 16. This fixed tool is supported immediately adjacent the tool head and is caused to chamfer the end 20 of the bores in the workpiece 2 as the tool head approaches said workpiece.

The spindle 3 has adjacent its end a recess having means for pivotally supporting a tool holder 21 comprising a pivot pin 22 extending through and supported by the wall of the spindle 3. The tool holder 21 is slotted in its end to receive a tool 23 which is held by threaded members 24 and 25 and is guided by plates 26 secured to the spindle 3 by screws 26a. The tool 23 chamfers the end 26b of the bore in the workpiece.

The tool holder 21 is provided with means engageable with a flat actuating face 28 on the end of its tool expanding rod 12 in order to cause movement of the tool holder between the return position shown in Fig. 6 and the extended position shown in Fig. 5. This means comprises a surface 27 on the tool holder 21 which is inclined with respect to the actuating face 28 on the end of the tool expanding rod 12 and which moves the tool holder 21 through its feed movement from the return position as the tool expanding rod 12 is shifted towards the left as shown in Figs. 2 and 5. A surface 29 on the tool holder 21 next to the surface 27 is engaged by the actuating face 28 on the rod 12 after the feed movement of the holder 21 has been completed. This surface is substantially parallel to the actuating face 28 when the holder 21 is extended to; in effect, provide a dwell and permit confined travel of the rod 12 toward the left without imparting movement to the holder 21.

In order to retract the tool holder 21, it is provided with an arm 30 positioned within a recess 31 in the tool expander rod 12. The arm 30 is engaged by an abutment 32 on the rod 12 as the rod 12 moves to the right as shown in Figs. 2 and 5. This engagement between the abutment 32 and arm 30 occurs subsequent to movement of the actuating face 28 on the rod out of engagement with the dwell surface 29 on the holder.

The open end of the spindle 3 is enclosed by a sleeve 35, and a plunger 36, urged outwardly by a spring 37, engages the sleeve 35 to cause the surfaces 27 and 29 on the holder to closely engage the actuating face 28 on the rod 12.

The rod 12 is recessed at 40 in order to permit sliding movement of the rod free of interference with the intermediate portion of the fixed tool 15.

The tool expander rod 12 is slidably keyed to the spindle 3 so that the rod is rotated with the spindle but still may slide with respect to the spindle in order to actuate the tool holder 21. As disclosed, the spindle 12 may have a key-way 45 in which are slidably received the keys 46.

The end of the rod 12 opposite the tool holder actuating end extends beyond the end of the spindle 3 and has keyed thereto a bearing support assembly 47 which rotatably supports thereon a spool 48 by means of thrust bearings 47a. The bearing support assembly 47 is secured on the end of the rod 12 against a shoulder 49 on the rod 12 by a threaded nut 50. Thus, as the rod 12 is rotated by its keyed connection with the spindle 3, the spool 48 may remain stationary by its rotatable mounting on the rod 12.

Means are provided for shifting the tool expander rods 12 comprising a spool yoke shaft 55 rotatably mounted in the tool head and extending transversely beneath the rods 12. The shaft 55 has a plurality of upstanding spool yokes 56 carrying shoes 57 supported by pins 58 which engage vertical recesses provided in the non-rotating spools 48. Also connected to the spool yoke shaft 55 is a cylinder arm 60 connected to an extension 61 of a piston rod 62 by a pin 63. The piston rod 62 is connected to a piston 63 mounted in a fluid cylinder 64 which may be connected to suitable mechanism for controlling the flow of fluid into the opposite ends thereof alternately to cause back and forth movement of the piston 63. The cylinder 64 is mounted for slight vertical movement and the shoes 57 may slide vertically in order to compensate for movement of pins 58 and 63 in an arcuate path.

Rotation of the spool yoke shaft 55 in one direction by the piston 63 will, through the spools 48, cause shifting of the rods 12 to move the movable tool holders 21 through their feed movement. Rotation of the spool yoke shaft 55 in the other direction will cause return of the movable tool holders 21 to their return position. This movement of the tool holders will be positive in both directions.

To indicate the complete movement of the movable tool holders 21, a plate 70 is secured to the spool yoke shaft 55 externally of the tool head 1 and has secured thereto a pair of adjustable spaced-apart switch-operating members 71 and 72 which alternately engage contacts 73 and 74 which may be connected in a suitable circuit. The switch 73, when engaged by the member 71 responsive to rotation of the spool yoke shaft 55, gives an indication that the tool holders 21 are in their return position and the switch 74, when operated by the member 72, gives an indication that the tool holders 21 have completed their feed movement and are in their fully-extended position.

It will thus be seen that a chamfering machine has been provided wherein the ends of the bores in the workpiece 2 adjacent the tool head will be chamfered as the tool head approaches the workpiece and upon completion of this operation the tool head will remain stationary while the movable tools 23 are positively moved through a feed stroke to chamfer the ends of the bore remote from the tool head 1. When the feed movement of the tools is completed, the tool expander rods 12 may be permitted to over-travel because of the dwell provided between the actuating face 28 on the rods 12 and the dwell surface 29 on the holders 21. The switch 74 will indicate the completion of the movement of the tools 23 and the piston 63 may then be actuated in the opposite direction to retract the movable tools 23 from engagement with the cylinder bores. The switch 73 will indicate that the movable tools 23 have been returned to their return positions and the tool head 1 may then be moved away from the workpiece 2 to withdraw the spindles 3 from the bores of the workpiece free of interference between the tools 23 and the workpiece.

It is possible to adjust the depth of cut made at the remote end of the bores in the workpiece 2 by the movable tools 23 by adjusting the position of the tools in their holders by a preset gauge. The tool spindle rods 12 may be shifted while the tool head 1 is away from the workpiece and this will cause movement of the movable tool holders 21 a fixed distance as determined by the actuating face 28 and surface 27 to their expanded position. It is then possible to gauge and set the tools 23 with respect to the movable tool holders by adjustment of the threaded members 24 and 25.

Another feature of the disclosed construction is that the fixed tools 15 and the movable tools 23 on the spindle are located immediately adjacent the end of the tool head 1 and thus no intermediate supports are needed for supporting a length of spindle between the end of the tool head 1 and the fixed tools 15.

It would be within the scope of this invention to utilize the tools to cut grooves in a bore rather than chamfer the ends thereof. Also it is believed evident that a tool head may carry one or more of the spindles 3, as desired, and that the showing of four spindles is not to be construed as limiting the invention to such a number.

We claim:

1. A chamfering machine for cylinder bores comprising, in combination, a tool head slidable toward and away from a workpiece, a plurality of spaced parallel hollow spindles rotatably mounted in said tool head and each having an end extended beyond the tool head, a tool support pivotally mounted adjacent the end of each spindle for pivotally supporting a tool for movement toward and away from the workpiece, each of the tool supports having a feed surface and a dwell surface at an angle thereto, means associated with each tool support for causing positive movement thereof toward and away from the work piece, including a plurality of rods rotatable with and slidably mounted in said spindles, there being a rod associated with each spindle, each rod having one end formed with an actuating face adapted for sequential engagement with the feed and dwell surfaces of the associated tool support, the other end of said rods extending beyond their associated spindles and each having a feed spool rotatably mounted thereon, means for positively shifting said rods simultaneously in either direction including a spool yoke shaft rotatably mounted in said head and extending transversely beneath said rods, a plurality of upwardly-extending spool yokes connected to said shaft, each of said feed spools having a spool yoke operatively connected thereto, and a hydraulic cylinder having its piston operatively connected to said spool yoke shaft for rotating said shaft in one direction to cause shifting of said rods to move said tool supports toward the work piece and for rotating said shaft in the other direction to shift said rods in the other direction and move said tool supports away from the work piece, and switch means operated by said spool yoke shaft to indicate completed movements of said tool supports toward and away from the work piece.

2. A chamfering machine comprising, in combination, a slidable tool head, a hollow spindle rotatably mounted in said tool head, a pivotally mounted tool holder adjacent the end of the spindle movable in a direction normal to the spindle axis, means on the holder for supporting a tool in a position to feed into a workpiece as the holder is pivoted outwardly from a rest position to a cutting position, and to position the tool within the periphery of the spindle when the holder is returned to said rest position, means for moving the holder between said positions comprising a tool expander rod slidable within the spindle and having an actuating face at one end thereof adjacent the holder, a first surface on the holder inclined with respect to said face for causing feed movement of the tool holder by sliding engagement with said face as the rod is shifted in one direction, a second surface on said holder disposed approximately parallel to said actuating face when the holder is in said cutting position and providing a dwell wherein the holder remains stationary even with continued movement of the rod in the same direction, and interengaging means on the holder and rod for returning the holder upon movement of the rod in the other direction.

3. A chamfering machine comprising, in combination, a slidable tool head, a hollow spindle rotatably mounted in said tool head, a pivotally mounted tool holder adjacent the end of the spindle movable in a direction normal to the spindle axis, means on the holder for supporting a tool in a position to feed into a workpiece as the holder is pivoted outwardly from a rest position to a cutting position, and to position the tool within the periphery of the spindle when the holder is returned to said rest position, means for moving the holder between said positions comprising a tool expander rod slidable within the spindle and having an actuating face at one end thereof adjacent the holder, a first surface on the holder inclined with respect to said face for causing feed movement of the tool holder by sliding engagement with said face as the rod is shifted in one direction, a second surface on said holder disposed approximately parallel to said actuating face when the holder is in said cutting position and providing a dwell wherein the holder remains stationary even with continued movement of the rod in the same direction.

References Cited in the file of this patent

UNITED STATES PATENTS

| | | |
|---|---|---|
| 1,233,994 | Dow | July 17, 1917 |
| 2,380,808 | Tyson | July 31, 1945 |
| 2,383,050 | Esson | Aug. 21, 1945 |
| 2,398,362 | Dare | Apr. 16, 1946 |
| 2,590,068 | Pekrul | Mar. 18, 1952 |